United States Patent [19]
Craig et al.

[11] Patent Number: 5,848,776
[45] Date of Patent: Dec. 15, 1998

[54] SYSTEM FOR HOLDING DOWN UNDERGROUND STORAGE TANKS AND METHOD OF USING

[75] Inventors: David Duncan Craig; Donald Andrew Craig, both of Auckland, New Zealand

[73] Assignee: Maskell Productions Limited, Auckland, New Zealand

[21] Appl. No.: 878,709

[22] Filed: Jun. 19, 1997

[30] Foreign Application Priority Data

Jun. 19, 1996 [NZ] New Zealand ............................ 286853

[51] Int. Cl.⁶ ...................................................... A47B 97/00
[52] U.S. Cl. ............................................................. 248/505
[58] Field of Search .................................... 248/505, 506, 248/508, 500, 154; 405/172, 154

[56] References Cited

U.S. PATENT DOCUMENTS

| | | | |
|---|---|---|---|
| 2,484,345 | 10/1949 | Hinz | 248/500 X |
| 3,810,364 | 5/1974 | Johnson | 248/49 X |
| 4,338,045 | 7/1982 | Cour | 405/172 |
| 4,955,573 | 9/1990 | Horvath | 248/154 X |
| 5,180,254 | 1/1993 | Matiere | 405/154 X |
| 5,730,552 | 3/1998 | Jahannesson et al. | 248/505 X |

FOREIGN PATENT DOCUMENTS 2 106 168  4/1983  United Kingdom .

Primary Examiner—Ramon O. Ramirez
Attorney, Agent, or Firm—Fish & Richardson P.C.

[57] ABSTRACT

A system for holding down underground storage tanks, such as fuel tanks at petrol stations, wherein the tank is tied down to anchors buried with the tank using straps. In order to tension and clamp the ends of the straps a clamping axle is used atop the tank which, when rotated, tightens the strap. The clamping axle is then locked into position and buried with the tank. Apparatus are provided to facilitate tightening of the clamping axle and to lock it into place once the strap reaches an appropriate tension.

24 Claims, 3 Drawing Sheets

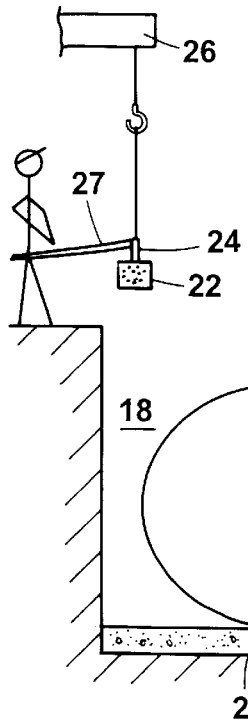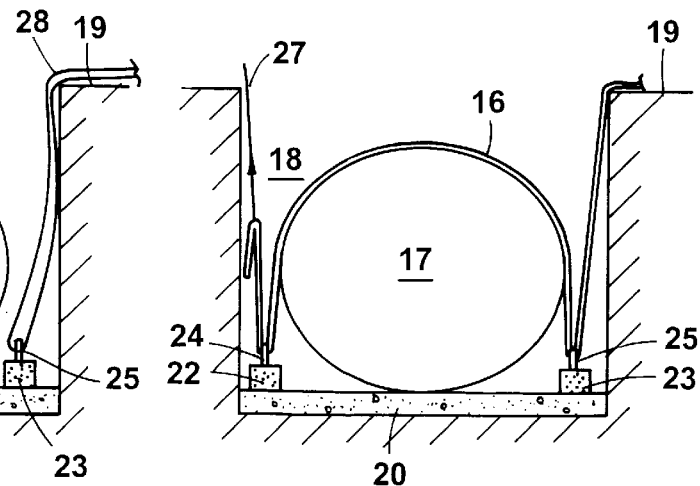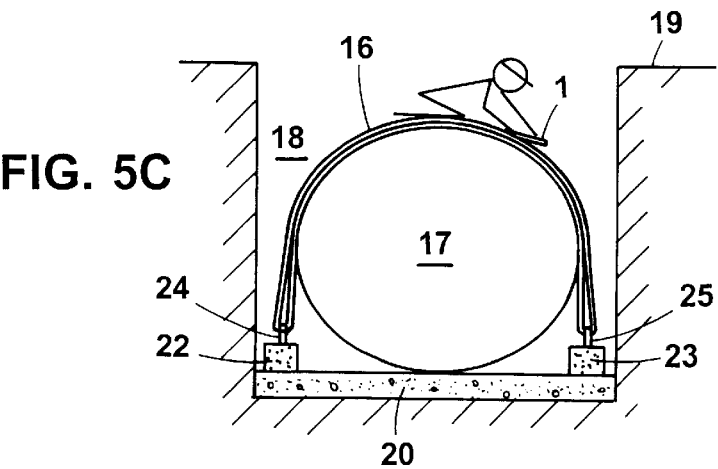
FIG. 5A
FIG. 5B
FIG. 5C

… … …

SYSTEM FOR HOLDING DOWN UNDERGROUND STORAGE TANKS AND METHOD OF USING

BACKGROUND OF THE INVENTION

1. Field of the Invention

This invention relates to fastening and/or clamping apparatus and more particularly, though not solely, to fastening and/or clamping apparatus for use in holding down underground storage tanks and methods of installing underground storage tanks utilising said apparatus.

2. Description of the Prior Art

Storage tanks which are designed to accommodate dangerous materials, such as gasoline, are often installed underground. An example is in the bulk storage of petrol at petrol stations, During the installation of these underground storage tanks it is often necessary to excavate a hole and then secure the tank to an anchor (often a concrete slab or concrete beams). The securing of the tank to the anchor assists in preventing the tank from moving in the event of the underground water table level rising (in the case of burying the tank in earth) and also prevents floating during installation (in the case of burying the tank in concrete).

Previous systems of holding down underground storage tanks include laying concrete anchor beams either side of the tank and laying semi rigid fibreglass straps with loops at each end over the tank which are connected to the anchors by way of steel shackles, turnbuckles, wire ropes and clamps. This method has served for many years but has a disadvantage that it is necessary for a person installing the tank to get into the tank excavation hole and attach each strap to the anchor. As the tanks are usually very large and heavy, it is dangerous for an installer to be in a position where the tank could roll onto them and it would therefore be an advantage if the installer was not required to enter the tank excavation hole. In addition, while the fibreglass straps are corrosion proof, the steel shackles, turnbuckles, wire ropes and clamps are potential corrosion weaknesses which could fail in time.

A further example of a prior system is described in United Kingdom patent application publication number GB2106168A to Spa Textiles Limited (Great Britain). In this system, a concrete anchor pad is poured and the tank positioned on top of the pad. Pre-fabricated straps of a set length are embedded in the anchor pad with the two ends brought up to the top of the tank where they are held together and tensioned with a ratchet device. This system has the disadvantages that a costly full concrete slab base is required, the straps need to be pre-fabricated with a ratchet device attached at one end, the ratchet device is attached at one end of the strap by a sewn loop which reduces the strength of the strap by as much as 25% and the ratchet device itself must be sacrificed with each installation.

It is, therefore, an object of the present invention to provide apparatus and/or a method for holding down underground storage tanks which will go at least some way towards overcoming the above disadvantages or which will at least provide the industry with a useful choice.

Accordingly, in a first aspect, the invention consists in clamping apparatus adapted to connect and tension the two unterminated ends of a strap means, said strap means adapted to be positioned substantially in a strap plane around an article, said clamping apparatus comprising:

first clamp plate means, second clamp plate means, spacing means connecting and spacing said first and second clamp plate means forming a strap feeding space between said first and second clamp plate means to allow said two unterminated ends of said strap means to be fed between said first and second clamp plate means, wherein said clamping apparatus is adapted to be rotated in a clamping direction around an axis substantially perpendicular to said strap plane, the rotation of said clamping means causing said strap means to wrap around said clamping apparatus upon itself thereby tensioning said strap means, In a further aspect, the invention consists in tank hold down apparatus comprising a single predetermined length of strap, the central position positioned atop a tank means, the two unterminated ends of said strap passed through lug means attached to anchor means either side of said tank means and then connected together atop said tank means utilising clamping apparatus as described in the above paragraph.

In a second aspect, the invention consists in a method of clamping the ends of a strap means around an object using a clamping axle means comprising two clamping plates separated by spacing means comprising the steps of:

i) arranging said strap means around said object, ii) inserting said ends of said strap means between said two clamping plates of said clamping axle, iii) rotating said clamping axle means thereby wrapping said strap means around said clamping axle means and tensioning said strap means, said step of rotating said clamping axle means also causing said strap means to wrap around said clamping axle means upon itself thereby clamping said ends of said strap means together.

The invention consists in the foregoing and also envisages constructions of which the following gives examples only.

BRIEF DESCRIPTION OF THE DRAWINGS

One preferred form of the invention will now be described with reference to the accompanying drawings in which:

FIGS. 5a, 5b and 5c are a series of front elevational views of a tank being installed underground utilising the clamping device of FIG. 1.

DETAILED DESCRIPTION OF THE PREFERRED EMBODIMENT

Figure 1:
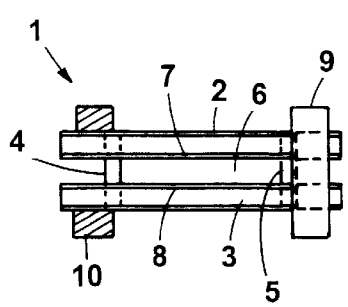
FIG. 1 is a partially sectioned end elevation of a clamping device constructed in accordance with one preferred form of the present invention.
Figure 2:
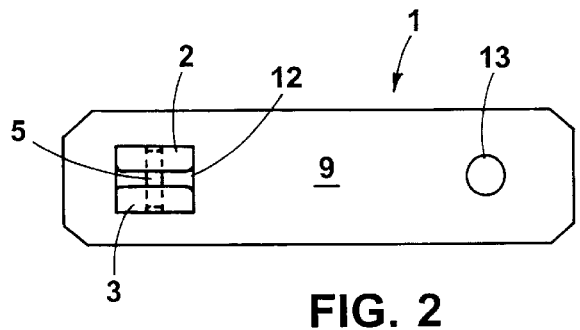
FIG. 2 is a side elevation of the clamping device shown in FIG. 1.
Figure 3:
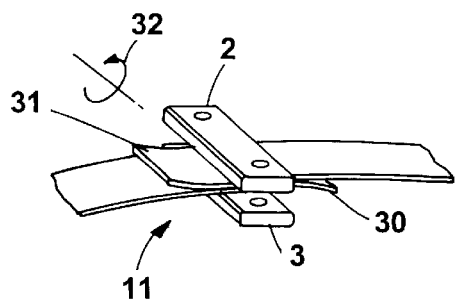
FIG. 3 is a perspective view showing the clamping device of FIG. 1 during the initial stages of installation.

With reference to the drawings, especially FIGS. 1 to 4, one preferred form of clamping device 1 according to the present invention is shown. The clamping device has two clamping plate means, for example clamping plates 2 and 3 which may be rectangular blocks of galvanised steel. Clamping plates 2 and 3 may be for example about 100 mm by 25 mm by 10 mm in size and preferably all edges are chamfered.

Connecting clamping plates 2 and 3 together are spacing means, for example spring pins 4 and 5. Spring pins 4 and 5 may, for example, connect clamping plates 2 and 3 by virtue of a tight fit in pin holes drilled through the clamping blocks. The spring pins 4 and 5 serve to space the two clamping blocks and also help to define a strap feeding space 6 between pins 4 and 5 and clamping face 7 of plate 2 and complimentary clamping face 8 of plate 3. The width of the feeding space between pins 4 and 5 may, for example, be about 52.5 mm. The combination of clamping plates 2 and 3 and spring pins 4 and 5 may be referred to as a clamping axle 11. The spring pins are compressible so that, upon an external force being applied, the two clamping plates may be forced closer together so that the clamping axle 11 may change between a normal uncompressed state to a second, clamping or compressed state in which the clamping faces 7 and 8 are moved closer together.

Attachable to the two ends of clamping axle 11 are side plate means, for example, side plates 5 and 10. Side plates 9 and 10 may be for example, 160 mm by 50 mm by 12 mm in size and are preferably fabricated from galvanised steel. It can be seen in FIG. 2 that the side plates are provided with a contoured hole 12 into which an end of clamping axle 11 may be inserted. The contoured hole 12 may, for example be square in shape to match the cross-sectional shape of the clamping axle in its normal, uncompressed position. It should be understood that the contoured hole 12 could be almost any shape except round, so long as it matches the shape and size of the end of the clamping axle 11.

A hole 13 is drilled through the end of each side plate, opposite the end in which the contoured hole is formed. The hole 13 allows for the insertion of fastening means, for example bolt 14 which passes through side plate 9, into a cylindrical spacer 15, and through side plate 10. The bolt is then securely fastened by a nut. The length of cylindrical spacer 15 is substantially equivalent to the width of the strap feeding space 6, or about 53 mm in length so that once tightened, the side plates effectively prevent the two clamping plates from moving further apart (than in their normal uncompressed state).

In use, the clamping device 1 may be, for example, utilised to clamp two ends of a strap means, for example webbing strap 16, holding a tank 17 down during underground installation. The installation of an underground storage tank will now be described with reference to the drawings, especially FIGS. 5a, 5b, 5c, 3 and 4. In order to install tank 17 underground, it is first necessary to excavate a tank hole or pit 18 beneath ground level 19. A layer of "tank bedding" 20 is deposited in the bottom of the tank excavation and the tank positioned on the bedding. As an example, the tank may be a fibreglass tank of a substantially circular cross-section, suitable for the storage of petrol beneath a service station. The outer surface of tank 17 may be provided with circular ribs 21 however ribs 21 are not essential to the present invention.

In order to ensure that the tank will not float up from the bottom of its hole (for example in areas of high natural water table levels, during heavy rain or during the pouring of concrete around the tank) the tank is strapped down to anchors 22 and 23 prior to burial. It should be noted that the downward force applied to the tank (once anchored) is far outweighed by the weight of the overburden (gravel and/or soil and/or concrete). Under the worst possible buoyancy condition (with the earth around the tank flooded to ground level), the combination of overburden plus downward force supplied by the anchors is designed to be about 1.2 times the upward buoyancy force.

The anchors 22 and 23 may, for example, be square columns of concrete into which have been inserted securing lugs 24, 25 which may be loops of steel rod secured at either end in the concrete anchor. A number of lugs are usually evenly spaced along the anchors length, preferably the same spacing as the previously mentioned ribs on the tank so that each strap may be secured over a rib (where ribs are provided on the tank). The anchors 22 and 23 are lowered into the hole, either side of tank 17, for example by a crane 26.

For each securing lug, a piece of webbing strap, which is preferably polyester webbing cut from a continuous length, is utilised to tie the tank down to the anchors. The strap may alternatively comprise any similar high strength, low elongation webbing such as that sold under the trade mark SPECTRA. The webbing strap is passed over the top of the tank and the two ends are passed through the securing lugs in the anchors and back up to the top of the tank. In order to prevent a person who is installing the tank from having to go down into the tank hole 18, it is possible to carry out the feeding of the webbing from outside of the hole.

If the anchors are to be inserted into the hole before the tank, then the installer could feed a drawstring 27, 28 (for example rope) through the lugs in the anchors and their lower the anchors into the hole while keeping the ends of the drawstrings out of the hole. Then, once the tank has been lowered into the holes the installer need only tie one end of the drawstring to an end of the webbing strap and pull the drawstring until the strap has passed down into the hole, through the lug and back out of the hole.

One end of the strap may then be passed over the tank to the other side and the process repeated until the desired strap arrangement is produced with both ends of the strap placed on top of the tank awaiting clamping.

Alternatively, if the tank is to be inserted before the anchors, then the strap could be inserted through the lugs in one anchors over the tank and through the lugs in the other anchor prior to the anchors being lowering into the hole.

In order to clamp the two ends (30 and 31) of the strap together and tension the strap, the installer stands on top of the tank and feeds the two ends 30 and 31 of strap 16 through the strap feeding space 6 of the clamping axle 11. Preferably the two ends are fed through from opposite directions but it would also be possible to feed both ends through from the same side of the clamping axle. The two ends are then pulled through the clamping axle. The installer may now cut the strap to length (if not already to length) or simply pull the strap ends 30 and 31 until they overlap on top of the tank by about 200 mm (with no tension applied to the strap). The ends are then inserted into the strap feeding space of clamping axle 11 (or clamping axle 11 may be assembled around the overlapped ends) until the ends 30 and 31 protrude from the clamping axle about 50 mm each side. The clamping axle is then manually compressed so that the two clamping plates 2 and 3 are pressed firmly against the two ends of the strap. The clamping axle is then carefully rotated by hand, for example in the anti-clockwise direction as indicated by arrow 32 in FIG. 3, ensuring that the webbing is evenly forming in layers around the clamping axle 11. In order to avoid tangling of the webbing strap, guides 33 may be used which comprise substantially "U" shaped pieces of material which are slightly wider than the strap 16. Preferably at least one complete revolution of the clamping axle is made by hand in order to look the strap in the clamping axle due to the force exerted between the two clamping plates 2 and 3.

It should be noted that sprig pins 4 and 5 could be replaced by solid incompressible pins without reducing the effectiveness of the present invention. In this case, as the strap is wound around the clamping axle upon itself, the strap itself is compressed and thereby clamped.

At this point, the side plates 9 and 10 are attached to the clamping axle 11 by inserting the ends of the clamping axle into the contoured holes of the side plates. The installer then uses the side plates as cranks or levers, rotating the clamping axle about 90° with a first side plate, then inserting the second side plate onto the clamping axle so that it is substantially flat on the tank, preventing the webbing from unwinding from the clamping axle in a clockwise direction when released by the installer. The installer then removes the first side plate and reattaches it parallel to the second side plate and turns the clamping axle a further about 90°. This process is repeated until at least two full revolutions of the clamping axle have been achieved. It should be understood that as the clamping axle is rotated, the tension in the strap will increase. As the tension in the strap increases, the clamping plates 2 and 3 will be forced closer together against the restoring force of the spring pins 4 and 5. As the clamping plates 2 and 3 come closer together, the clamping force on the two ends of strap 16 increases. It is anticipated that the present device will be easily able to provide a tension of up to 350 Newtons.

Figure 4:
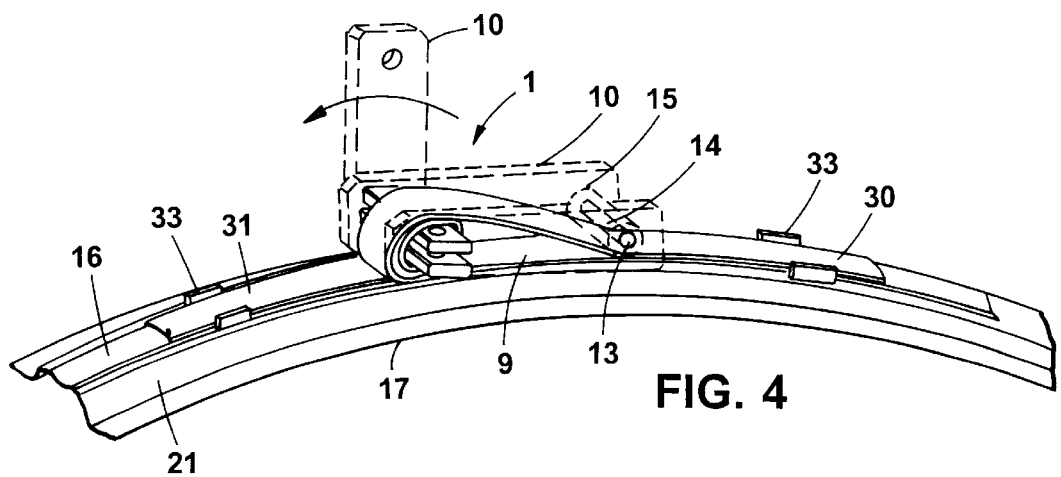
FIG. 4 is a perspective view showing the clamping device of FIG. 1 during the latter stages of installation.

In order to lock the clamping device, the two side plates are first positioned parallel to each other, flat against the tank with the clamping axle passing through their contoured holes (as shown in dashed lines in FIG. 4). Spacer 15 is then positioned over the webbing between the two side plates and bolt 14 is passed through tie plates and spacer. A nut is screwed onto the end of the bolt and tightened fully. The clamp is now secured and incapable of unravelling accidentally. The tank may then be buried.

Figure 6:
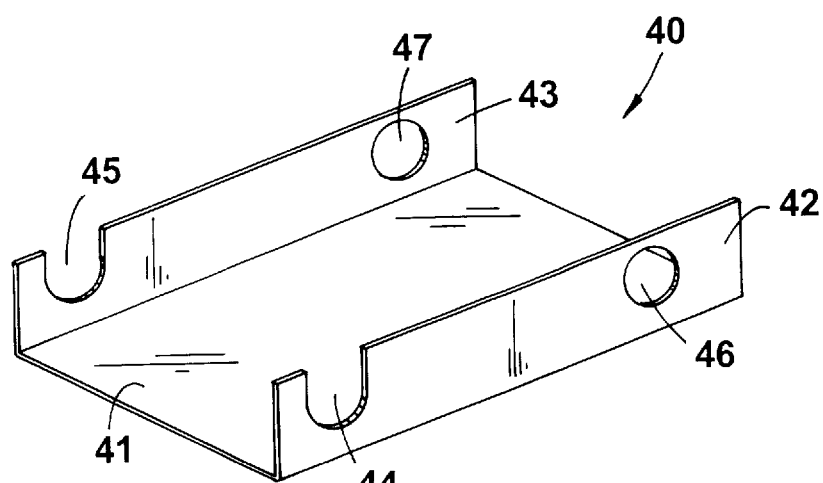
FIG. 6 is a perspective view of an assembly guide used in the alternative preferred embodiment of the present invention with the clamping device of FIG. 1.

In an alternative preferred embodiment of the present invention, an assembly guide 40 as shown in FIG. 6 may be used in conjunction with the clamping device 1. The assembly guide is preferably fabricated from sheet metal and has a base 41 and two substantially perpendicular side walls 42 and 43. Recesses or clamping axle receiving means 44 and 45 are provided in each of the side walls and are preferably "U" shaped cutouts. Holes 46 and 47 are also provided in each of the side walls In use, the assembly guide 40 of FIG. 6 is positioned against the surface of the tank with the free ends of the strap crossed over the base 41. Alternatively, the base may be placed on top of the first layer of strap 16 (as seen in FIG. 5b) and the ends of strap 16 folded over the base 41. The free ends are then positioned between clamp plates 2 and 3 as in FIG. 3 and the clamp plates closed together (if compressible pins are used as spacing means). The clamping axle is then positioned across the assembly guide with the ends of the clamping axle positioned in recesses 44 and 45, thereby raising the clamping axle above the surface of the tank to allow easier rotation. A galvanised pipe spacer may then be inserted through holes 46 and 47 with the strap positioned between the pipe and the base 41. The clamping axle may then be rotated, preferably initially by hand to take up any slack and then by attaching lever means with appropriately shaped jaws at the ends of the clamping axle, the assembly guide 40 guiding the strap.

Once a predetermined tension has been achieved in the strap, one lever may be used to hold the clamping axle (to avoid unwinding) while the abovementioned side plates are attached over the ends of the clamping axle. A bolt is then passed trough the side plates and through the galvanised pipe spacer and tightened with a nut to complete the clamp.

Thus the present invention, at least in the preferred form, provides a self contained unit for clamping and tensioning a strap around a storage tank. The component pieces of the clamping device are utilised in the tensioning of the strap without the need for extra tools or expensive ratchet devices which would need to be sacrificed and buried with the tank. In addition, the present invention allows for the use of continuous webbing without any "off site" preparation required (for example stitching ratchets into the webbing). This also allows for the straps to be simply cut to length to suit the specific site conditions (occasionally the anchors may be buried beneath the bedding layer meaning that the straps need to be longer). The locking mechanism of the present invention allows the full strength of the webbing straps to be utilised whereas some previous methods involving sewing locking mechanisms into the straps, would either fail due to the weakness introduced by the stitches or could not be tensioned as highly as the present invention allows.

We claim:

1. Clamping apparatus adapted to connect and tension the two unterminated ends of a strap means, said strap means adapted to be positioned substantially in a strap plane around an article, said clamping apparatus comprising:

first clamp plate means, second clamp plate means, spacing means connecting and spacing said first and second clamp plate means and forming a strap feeding space therebetween to allow said two unterminated ends of said strap means to be fed between said first and second clamp plate means, said first clamp plate means positioned between said article and said ends of said strap means, wherein said clamping apparatus is also provided with lever means adapted to rotate said first and second clamp plate means in a clamping direction around an axis substantially perpendicular to said strap plane, the rotation of said clamping means causing said strap means to wrap around said clamping apparatus upon itself thereby tensioning said strap means.

2. Clamping apparatus as claimed in claim 1 wherein said spacing means comprise pin means provided either side of said strap means, said strap feeding space defined by the region enclosed by said first and second clamp plate means and said pin means.

3. Clamping apparatus as claimed in claim 1 or claim 2 wherein said first and second clamp plate means are substantially rectangular blocks, wherein said first clamp plate means has a clamping face and said second clamp plate means has a complimentary clamping face adapted to be positioned adjacent said clamping face of said first clamp plate means.

4. Clamping apparatus as claimed in claim 3 wherein said spacing means are located substantially perpendicular to said clamping face and said complimentary clamping face.

5. Clamping apparatus as claimed in claim 1 or claim 2 wherein said first clamp plate means, said second clamp plate means and said spacing means together form a clamping axle means and said lever means comprise at least one side plate means connected to said clamping axle means to facilitate rotation of said clamping axle means.

6. Clamping apparatus as claimed in claim 5 wherein said clamping axle means has a rotational axis and two axially separated ends which are substantially square or rectangular in cross-section and said at least one side plate means is connected substantially perpendicularly to said rotational axis by insertion of an end of said clamping axle means into contoured hole means of said side plate means.

7. Clamping apparatus as claimed in claim 6 wherein said clamping axle is provided with two said side plate means, one at each axially separated end, each side plate means adapted to be utilised to rotate said clamping axle means until said strap means reaches a predetermined tension, said two side plate means are then positioned substantially parallel to each other against said article and connected together by fastening means, said fastening means provided substantially parallel with said rotational axis of said clamping axle means and substantially perpendicular to said strap means, and preventing said clamping axle from rotating in a counter-clamping direction due to the tension developed in said strap means.

8. Clamping apparatus as claimed in claim 1 wherein said spacing means comprise compressible pin means and wherein rotation of said clamping apparatus in said clamping direction of rotation causes an increase in tension in said strap means, thereby causing said compressible pin means to compress, clamping said ends of said strap means between said first and second clamp plate means.

9. Tank hold down apparatus comprising a single predetermined length of strap, the central portion positioned atop a tank means, the two unterminated ends of said strap passed through respective lugs means attached to anchor means either side of said tank means and then connected together atop said tank means utilising clamping apparatus as claimed in either claim 1 or claim 2.

10. Clamping apparatus as claimed in claim 1 or claim 2 wherein assembly guide means are provided having a base adapted to be positioned between said article and said strap means and a pair of side walls extending substantially perpendicularly from said base, said assembly guide means holding said clamping apparatus above said article and guiding said strap means during tensioning.

11. Clamping apparatus as claimed in claim 10 wherein said side walls of said assembly guide means are each provided with clamping apparatus receiving recess means which are adapted to retain said clamping apparatus therein while allowing rotation of said clamping apparatus about said rotational axis.

12. Clamping apparatus as claimed in claim 11 wherein said clamping apparatus receiving means comprise a substantially "U" shaped recess cutout in each said side wall and wherein said clamping apparatus are thereby held above said article.

13. A method of clamping the ends of a strap means around an object using a clamping axle means comprising two clamping plates separated by spacing means comprising the steps of:

i) arranging said strap means around said object, ii) inserting said ends of said strap means between said two clamping plates of said clamping axle, iii) rotating said clamping axle means thereby wrapping said strap means around said clamping axle means and tensioning said strap means, said step of rotating said clamping axle means also causing said strap means to wrap around said clamping axle means upon itself thereby clamping said ends of said strap means together.

14. A method of clamping as claimed in claim 13 wherein said method also includes the step of attaching side plate means to said clamping axle means and said step of rotating said clamping axle is carried out by utilising said side plate means as a lever.

15. A method of clamping as claimed in claim 14 wherein said method also includes the step of repeatedly detaching said side plate means from said clamping axle while preventing said clamping axle means from rotating and then reattaching said side plate means to said clamping axle and repeating said step of rotating said clamping axle means until a predetermined tension is attained in said strap means.

16. A method of clamping as claimed in claim 15 wherein said method also includes the step of locking said clamping axle once said predetermined tension has been attained.

17. A method of clamping as claimed in claim 16 wherein said clamping axle has a rotational axis and two axially separated ends and said step of locking said clamping axle in position includes the steps of:

a) attaching a first side plate means to one end of said clamping axle means, b) attaching a second side plate to the second end of said clamping axle means substantially parallel to said first side plate means, c) connecting said first and second side plate means together using fastening means, said strap means positioned between said object and said fastening means.

18. A method of clamping as claimed in claim 13 or claim 14 wherein said object is a tank means and said step of arranging said strap means around said object comprises the steps of:

a) excavating a hole, b) placing said tank means in said hole, c) feeding each end of said strap means through lug means attached to anchor means, one anchor means provided either side of said hole for each end of said strap means, d) positioning said separate anchor means either side of said tank in said hole with the central portion of said strap means running over said tank means, e) placing the two ends of said strap means together on top of said tank means.

19. A method of clamping as claimed in claim 18 wherein said steps of feeding each of said two ends of said strap means through lug means and then positioning said anchor means either side of said tank means comprise the steps of:

a) feeding a separate draw sting means through lug means in each said anchor means, b) lowering each said anchor means into said hole, either side of said tank means with the ends of said draw strings out of said hole, c) attaching one end of said strap means to one end of a draw string means, d) pulling the unattached end of said draw string attached to said strap means, until said strap means is fed through said lug and returned out of said hole, e) passing one end of said strap across said tank and repeating steps(c) and (d).

20. A method of clamping as claimed in claim 13 wherein said spacing means comprise compressible pin means and wherein said step of rotating said clamping axle means causes said compressible pin means to compress thereby clamping said ends of said strap means together.

21. A method of clamping as claimed in claim 13 or claim 14 wherein said step of rotating said clamping axle means comprises the steps of a) attaching a lever means to one end of said clamping axle means, b) rotating said clamping axle means using said lever means, c) attaching a further lever means to the other side of said clamping axle means, d) disconnecting said lever means from said clamping axle means, d) rotating said clamping axle means using said fiber lever means, and e) repeating said steps (a) to (d) until the tension in said strap means reaches a predetermined tension.

22. A method of clamping as claimed in claim 13 or claim 14 wherein prior to said step of rotating said clamping axle means, assembly guide means are positioned on said object, said assembly guide means comprising a base positioned against said object or on a central portion of said strap means over said object with the ends of said strap means folded over said base and two side walls extending substantially perpendicularly from said base on either side of said strap means, said assembly glide means holding said clamping axle means above said object.

23. A method of clamping as claimed in claim 22 wherein said side walls of said assembly guide means are both provided with clamping axle receiving means which are adapted to retain said clamping axle means therein while allowing rotation of said clamping axle means and said method includes the step of positioning said clamping axle means in said clamping axle receiving means prior to rotating said clamping axle means.

24. A method of clamping as claimed in claim 23 including the step of attaching lever means to the ends of said clamping axle means and rotating said clamping axle means until said strap means reaches a predetermined tension and then attaching side plate means to said clamping axle means to prevent said clamping axle means from rotating.

* * * * *